(12) United States Patent
Zeiler et al.

(10) Patent No.: US 11,068,159 B1
(45) Date of Patent: Jul. 20, 2021

(54) SYSTEMS AND METHODS FOR FACILITATING KEYBOARD-BASED SEARCH OF LOCAL AND CONNECTED DIGITAL MEDIA ITEMS WITHIN A MESSAGING APPLICATION

(71) Applicant: Clarifai, Inc., New York, NY (US)

(72) Inventors: Matthew Zeiler, New York, NY (US); John Rogers, New York, NY (US); John Sloan, New York, NY (US); Jason Culler, New York, NY (US)

(73) Assignee: Clarifai, Inc., New York, NY (US)

(*) Notice: Subject to any disclaimer, the term of this patent is extended or adjusted under 35 U.S.C. 154(b) by 881 days.

(21) Appl. No.: 15/253,653

(22) Filed: Aug. 31, 2016

(51) Int. Cl.
- *G06F 3/0488* (2013.01)
- *G06F 3/16* (2006.01)
- *G06F 3/0482* (2013.01)
- *H04L 12/58* (2006.01)
- *G06F 16/9535* (2019.01)

(52) U.S. Cl.
CPC ........ *G06F 3/04886* (2013.01); *G06F 3/0482* (2013.01); *G06F 3/04883* (2013.01); *G06F 3/167* (2013.01); *G06F 16/9535* (2019.01); *H04L 51/046* (2013.01)

(58) Field of Classification Search
None
See application file for complete search history.

(56) References Cited

U.S. PATENT DOCUMENTS

| | | | | |
|---|---|---|---|---|
| 5,818,446 A | * | 10/1998 | Bertram | G06F 9/451 715/746 |
| 2004/0150673 A1 | * | 8/2004 | Dobronsky | G06F 3/04817 715/810 |
| 2010/0153376 A1 | * | 6/2010 | Davidson | G06F 17/276 707/723 |
| 2010/0162158 A1 | * | 6/2010 | Dittmar | G06F 3/0237 715/780 |
| 2015/0066479 A1 | * | 3/2015 | Pasupalak | G06F 17/27 704/9 |
| 2015/0269634 A1 | * | 9/2015 | Etezal | G06Q 30/0276 705/14.16 |

OTHER PUBLICATIONS

Definition of overlaid windows, Apr. 12, 2015, Webopedia.com.*

* cited by examiner

*Primary Examiner* — Cesar B Paula
*Assistant Examiner* — John M Heffington
(74) *Attorney, Agent, or Firm* — Pillsbury Winthrop Shaw Pittman LLP

(57) ABSTRACT

Keyboard-based search of local and/or connected digital media items may be facilitated. A digital media item search interface may be presented in the same view as a messaging interface. The digital media item search interface may receive input such as from an on-screen keyboard to facilitate editing of user-provided search queries and submission of the user-provided search queries. The digital media item search interface may present digital media item tags relating to context information based on input received by the digital media item search query field. The digital media item search interface may present visual previews of local and/or connected digital media items corresponding to digital media item tags presented in the digital media item tag field. The digital media item search interface may receive user selections of individual digital media items to be communicated to one or more other users via the messaging interface.

20 Claims, 7 Drawing Sheets

SYSTEMS AND METHODS FOR FACILITATING KEYBOARD-BASED SEARCH OF LOCAL AND CONNECTED DIGITAL MEDIA ITEMS WITHIN A MESSAGING APPLICATION

FIELD OF THE DISCLOSURE

This disclosure relates to systems and methods for facilitating keyboard-based search of local and connected digital media items within a messaging application.

BACKGROUND

Conventional messaging applications such as Multimedia Messaging Service (MMS) allow users to send messages that include multimedia content to and from mobile devices over a cellular network or over the Internet such as via WiFi networks. Such multimedia content may include one or more of text, images, videos, audio, and/or other multimedia content. On most modern Smartphones and other mobile devices, text messages are typically entered via an on-screen keyboard that is part of a messaging interface showing a history of prior messages. Some third-party keyboards exist that allow a user to send graphic symbols, commonly known as "emojis," which represent ideas or concepts and are provided in a limited set to select from via the third-party keyboards. When it comes to sending multimedia content beyond simple text or emojis, users are typically required to exit the messaging application and open a separate application (e.g., photo album, Internet browser, etc.) to access multimedia content such as digital photos or videos. The user then must "copy" one or more of those multimedia content items while in the separate application, go back to the messaging application, and finally "paste" the copied multimedia content items into a dialog entry field of the messaging application.

SUMMARY

Exemplary implementations disclosed herein provide a combined messaging and digital media item search interface allowing a user to search his or her local and/or connected digital media items, videos, and/or other multimedia items directly from the keyboard of a messaging application. The search may be powered by artificial intelligence specializing in visual recognition, which automatically generates "tags" by which the user can search their media. Upon installing a "keyboard app" according to exemplary implementations on their iOS®, Android®, and/or other device, users can install and grant access to it via the Settings menu. Subsequently, users can access the new keyboard app by toggling amongst different available keyboards. Upon selecting the keyboard app according to exemplary implementations, users can search their local and connected multimedia items based on queries such as people, objects, locations, dates, and/or other queries.

Accordingly, one aspect of the disclosure relates to a system configured for facilitating keyboard-based search of local and/or connected digital media items. The system may comprise one or more hardware processors configured by machine-readable instructions to provide a digital media item search interface for presentation in the same view as a messaging interface. The messaging interface may include an on-screen keyboard, a dialog entry field, and a dialog window. The on-screen keyboard may be configured to receive user selections of characters. The dialog entry field may be configured to receive input to facilitate editing of user-provided dialog entries and submission of the user-provided dialog entries. The dialog window may be configured to present previously submitted dialog entries from two or more users. The digital media item search interface may include a digital media item search query field, a digital media item tag field, and a digital media item preview frame. The digital media item search query field may be configured to receive input from the on-screen keyboard to facilitate editing of user-provided search queries and submission of the user-provided search queries. The digital media item tag field may be configured to present digital media item tags based on input received by the digital media item search query field, and to receive user selections of individual digital media item tags. A given digital media item tag may relate to context information associated with individual ones of the digital media items. The digital media item preview frame may be configured to present visual previews of digital media items. The digital media items may be one or both of local digital media items or connected digital media items. The digital media items may correspond to digital media item tags presented in the digital media item tag field. The digital media item preview frame may be configured to receive user selections of individual digital media items to be communicated to one or more other users via the messaging interface.

Another aspect of the disclosure relates to a method for facilitating keyboard-based search of local and/or connected digital media items. The method may be performed by one or more hardware processors configured by machine-readable instructions. The method may include providing a digital media item search interface for presentation in the same view as a messaging interface. The digital media item search interface may include a digital media item search query field, a digital media item tag field, and a digital media item preview frame. The messaging interface may include an on-screen keyboard configured to receive user selections of characters, a dialog entry field configured to receive input to facilitate editing of user-provided dialog entries and submission of the user-provided dialog entries, and a dialog window configured to present previously submitted dialog entries from two or more users. The method may include receiving input via the digital media item search query field from the on-screen keyboard to facilitate editing of user-provided search queries including a first user-provided search query. The method may include submitting the first user-provided search query via the digital media item search query field. The method may include presenting digital media item tags via the digital media item tag field based on input received by the digital media item search query field. A given digital media item tag may relate to context information associated with individual ones of the digital media items. The method may include receiving user selections of individual digital media item tags via the digital media item tag field. The method may include presenting visual previews of digital media items via the digital media item preview frame. The digital media items may be one or both of local digital media items or connected digital media items corresponding to digital media item tags presented in the digital media item tag field. The method may include receiving user selections via the digital media item preview frame of individual digital media items to be communicated to one or more other users via the messaging interface.

Yet another aspect of the disclosure relates to a non-transient machine-readable storage medium having instruction embodied thereon, the instructions being executable to cause one or more hardware processor to perform a method for facilitating keyboard-based search of local and/or connected digital media items. The method may include providing a digital media item search interface for presentation in the same view as a messaging interface. The digital media item search interface may include a digital media item search query field, a digital media item tag field, and a digital media item preview frame. The messaging interface may include an on-screen keyboard configured to receive user selections of characters, a dialog entry field configured to receive input to facilitate editing of user-provided dialog entries and submission of the user-provided dialog entries, and a dialog window configured to present previously submitted dialog entries from two or more users. The method may include receiving input via the digital media item search query field from the on-screen keyboard to facilitate editing of user-provided search queries including a first user-provided search query. The method may include submitting the first user-provided search query via the digital media item search query field. The method may include presenting digital media item tags via the digital media item tag field based on input received by the digital media item search query field. A given digital media item tag may relate to context information associated with individual ones of the digital media items. The method may include receiving user selections of individual digital media item tags via the digital media item tag field. The method may include presenting visual previews of digital media items via the digital media item preview frame. The digital media items may be one or both of local digital media items or connected digital media items corresponding to digital media item tags presented in the digital media item tag field. The method may include receiving user selections via the digital media item preview frame of individual digital media items to be communicated to one or more other users via the messaging interface.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
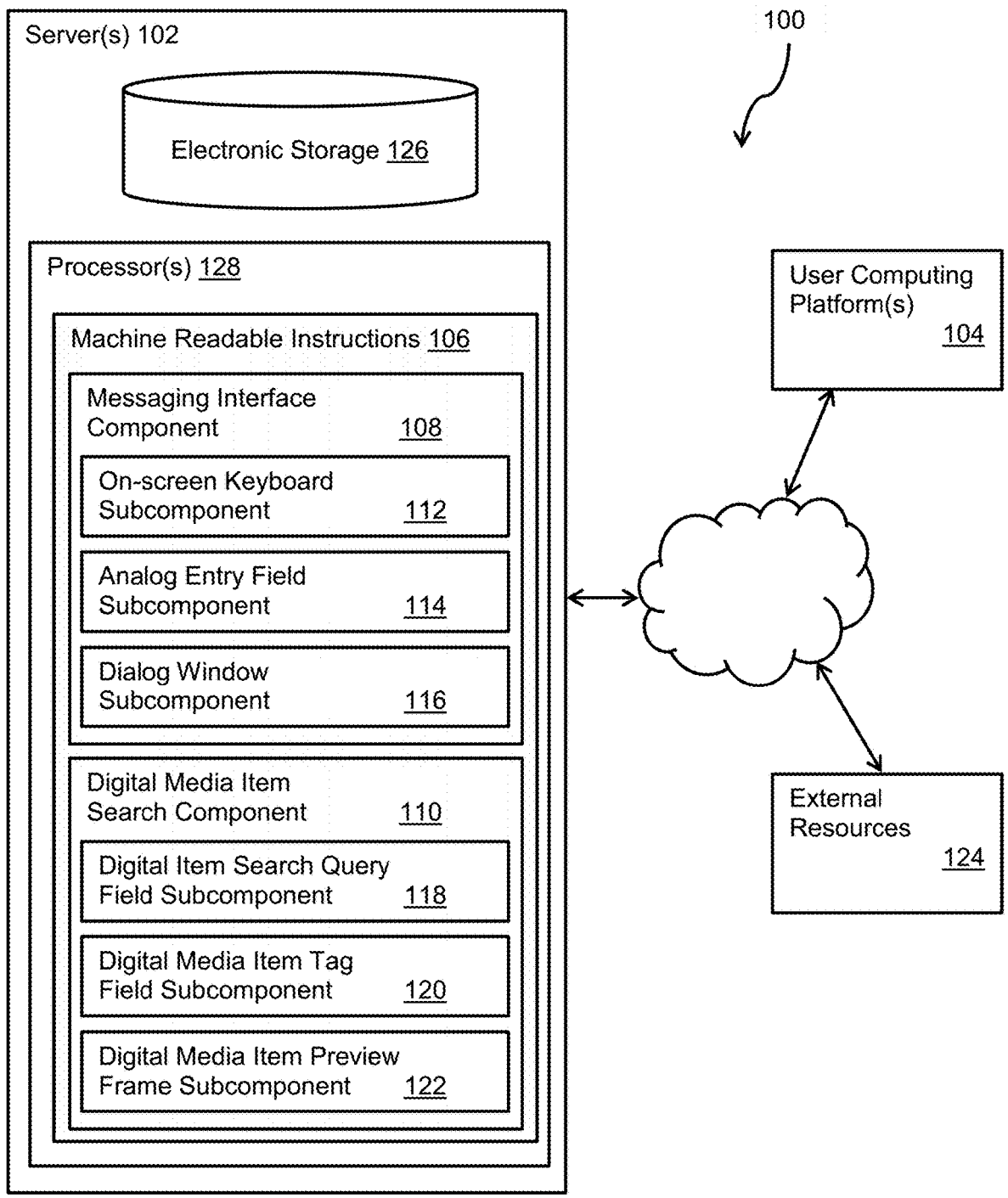
FIG. 1 illustrates a system configured for facilitating keyboard-based search of local and connected digital media items, in accordance with one or more implementations.

FIG. 1 illustrates a system configured for facilitating keyboard-based search of local and connected digital media items, in accordance with one or more implementations. In some implementations, system 100 may include one or more server 102. The server(s) 102 may be configured to communicate with one or more user computing platforms 104 according to a client/server architecture. The users may access system 100 via user computing platform(s) 104.

Digital media items may include one or more of digital photos, images, videos, audio, and/or other digital media items. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

The server(s) 102 and/or computing platform(s) 104 may be configured to execute machine-readable instructions 106. The machine-readable instructions 106 may include one or more of a messaging interface component 108, a digital media item search component 110, and/or other components. The messaging interface component 108 may be configured provide a messaging interface via user computing platform(s) 104. The messaging interface may be associated with a native application of an operating system of a given user computing platform 104. The messaging interface may be associated with a third-party application configured to run on an operating system of a given user computing platform 104. The digital media item search component 110 may be configured to provide a digital media item search interface via user computing platform(s) 104. In some implementations, the digital media item search interface may be presented in the same view as a messaging interface. FIGS. 2A, 2B, 2C, 2D, and 2E illustrate exemplary views of a combined messaging and digital media item search interface 200, in accordance with one or more implementations.

Figure 2A:
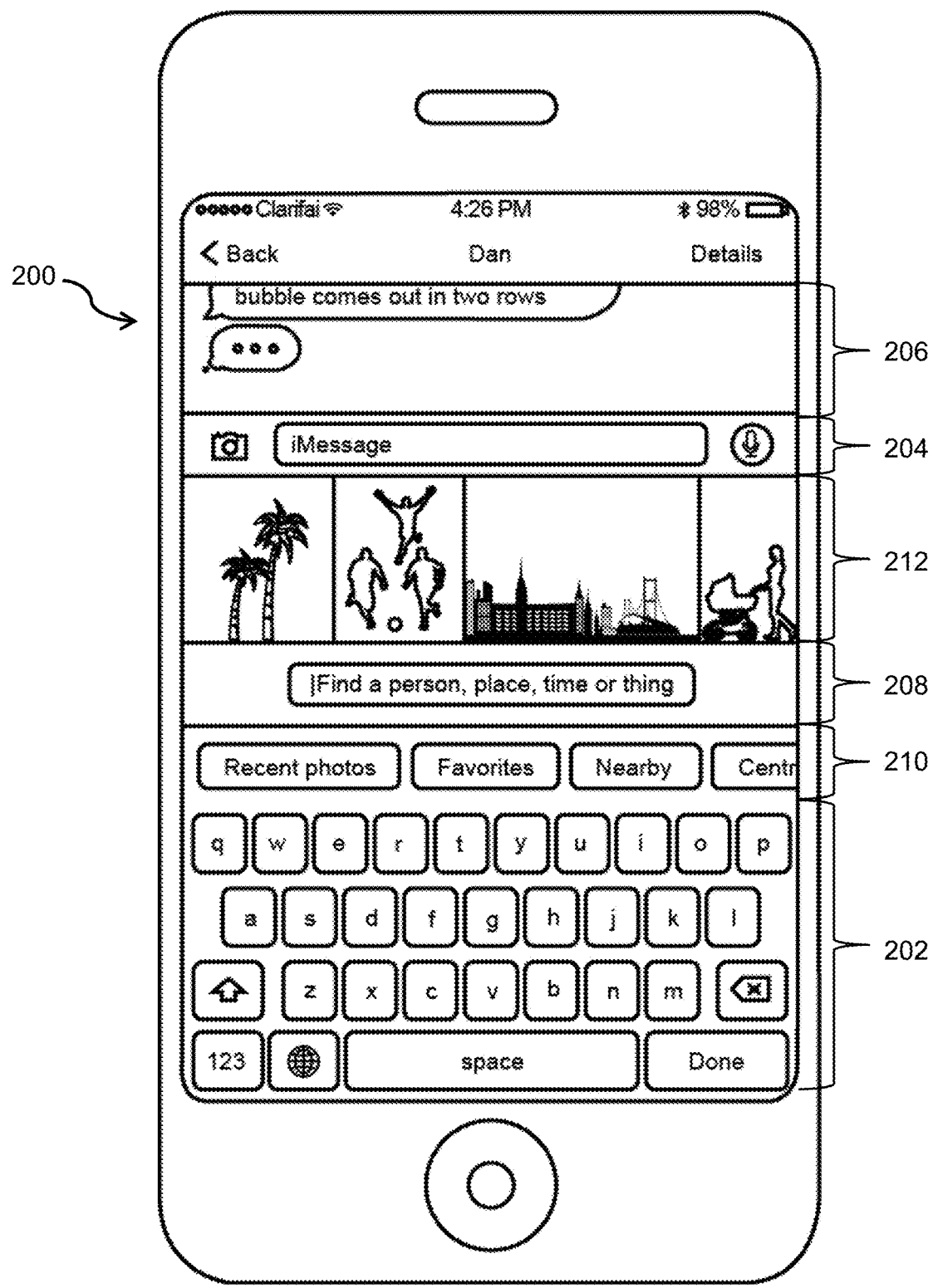
FIGS. 2A, 2B, 2C, 2D, and 2E illustrate exemplary views of a combined messaging and digital media item search interface, in accordance with one or more implementations.
Figure 2B:
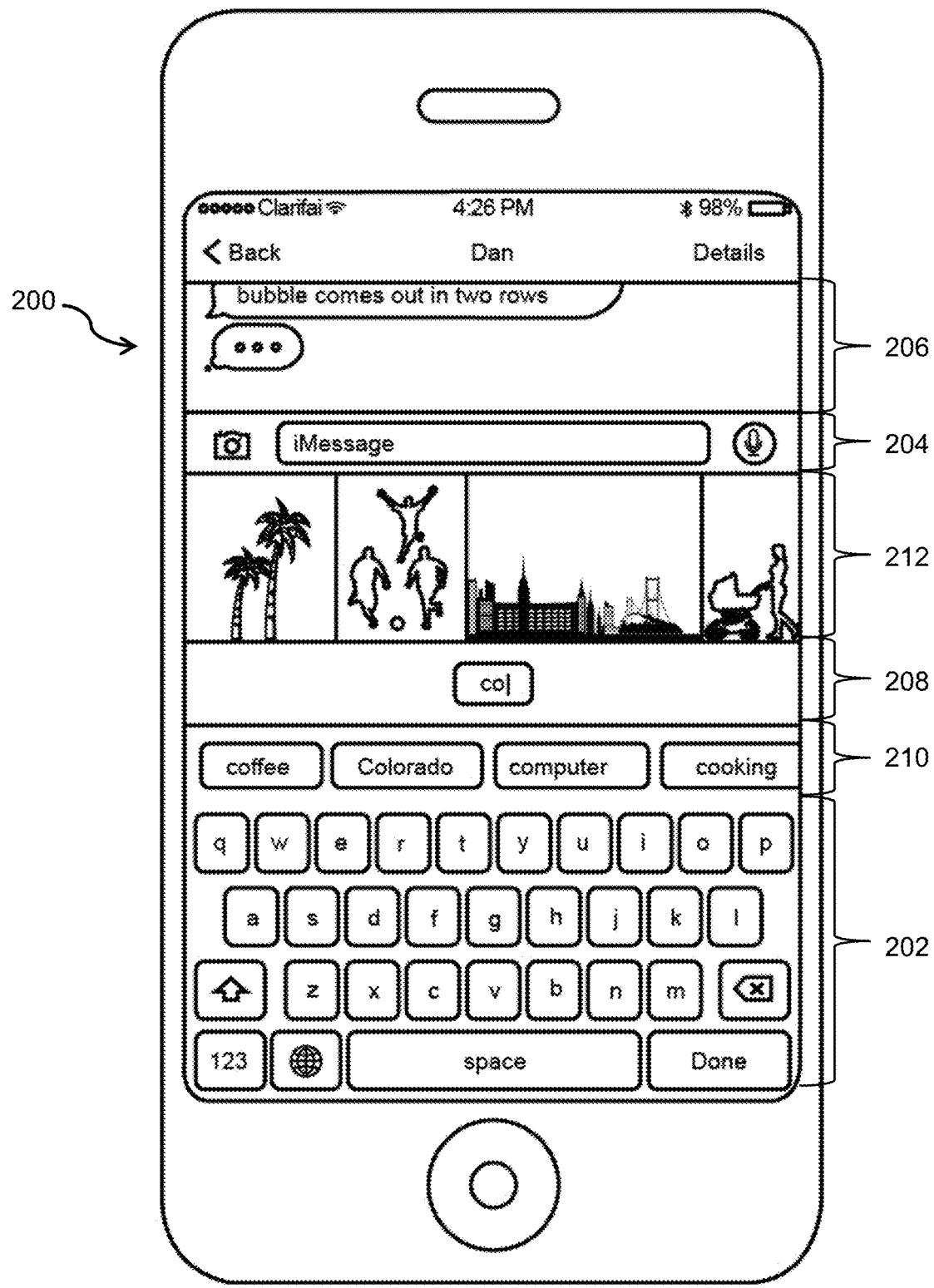
Figure 2C:
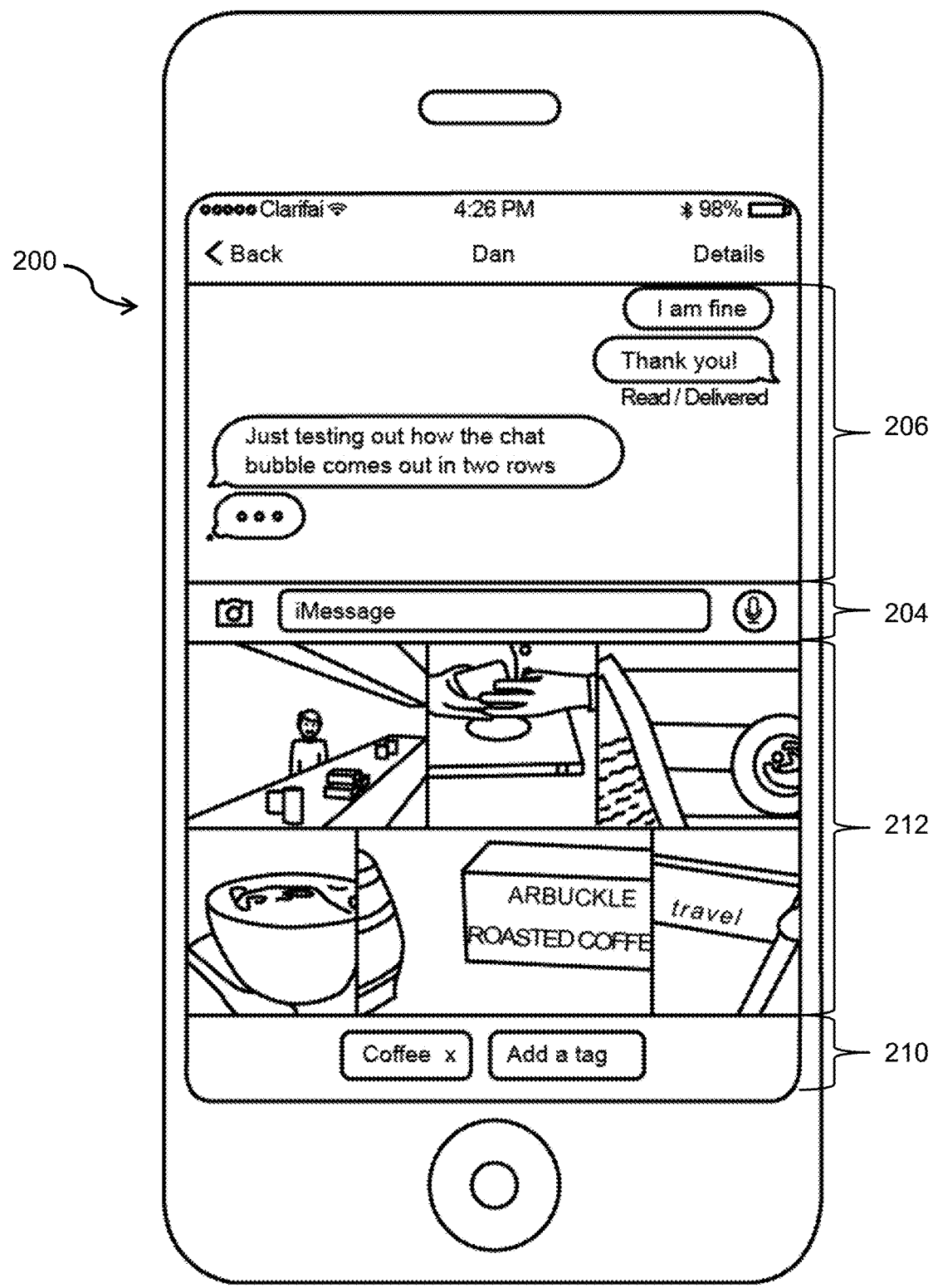
Figure 2D:
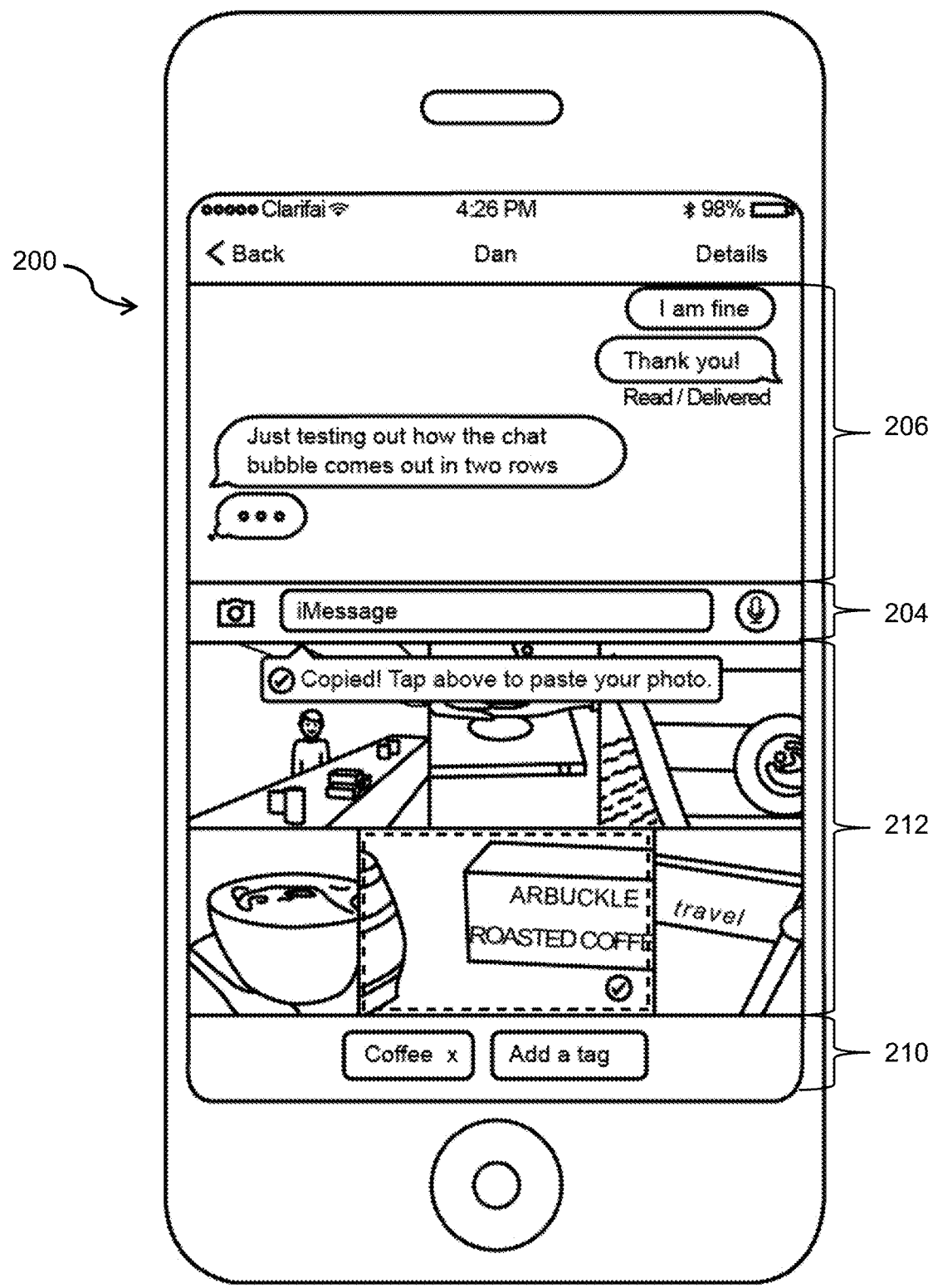
Figure 2E:
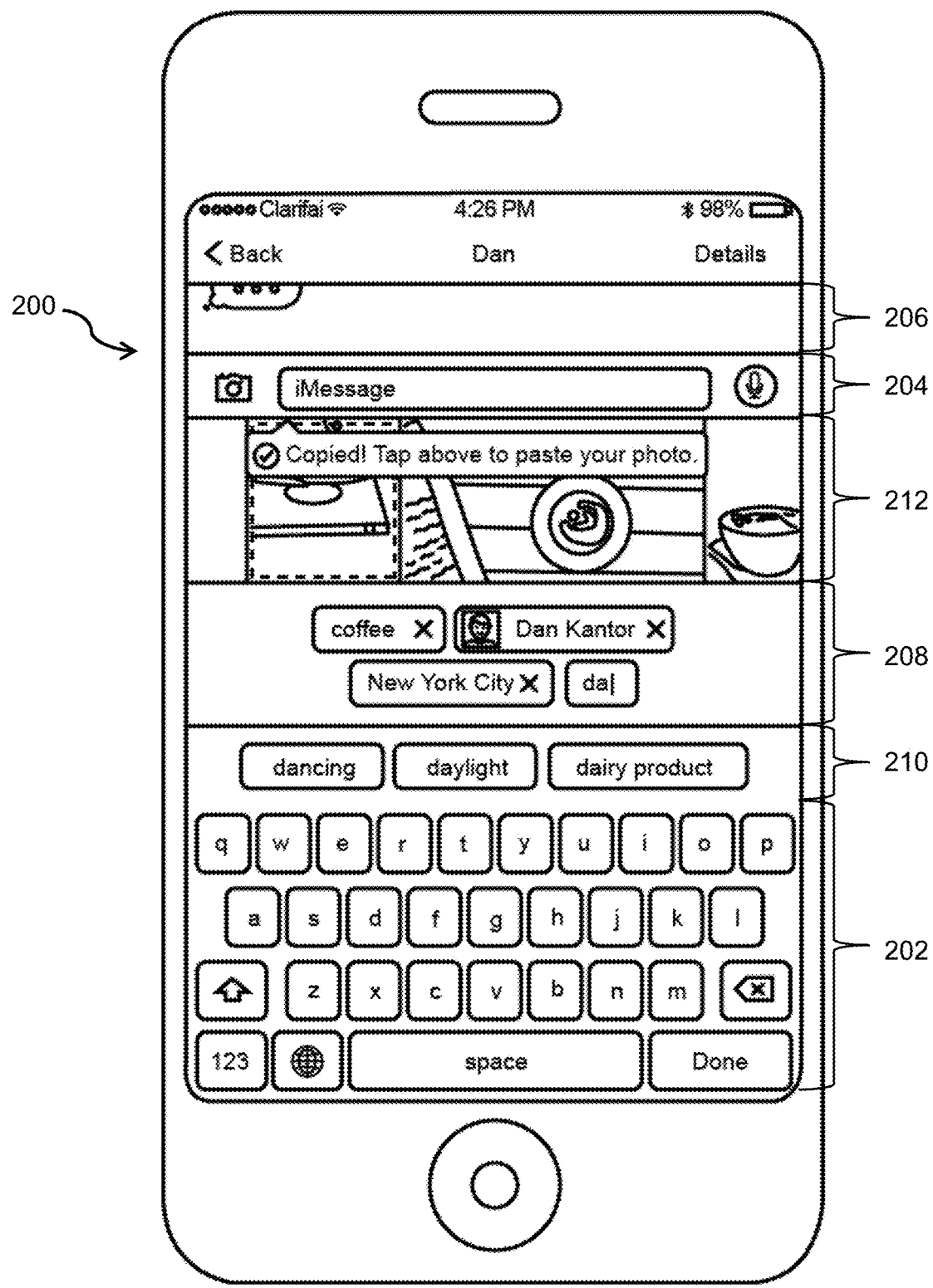

Referring again to FIG. 1, messaging interface component 108 may include one or more of an on-screen keyboard subcomponent 112, a dialog entry field subcomponent 114, a dialog window subcomponent 116, and/or other subcomponents. The on-screen keyboard subcomponent 112 may be configured to receive user selections of alphanumeric characters and/or other characters. Examples of such other characters may include one or more of symbols, emojis, ideograms, emoticons, pictographs, and/or other characters accessible via a keyboard. In some implementations, on-screen keyboard subcomponent 112 may be configured to provide a graphical, on-screen keyboard which receives user selections of alphanumeric characters responsive to a user touching a touchscreen presenting the on-screen keyboard. A non-limiting example of such an on-screen keyboard is illustrated in FIGS. 2A, 2B, and 2E by on-screen keyboard 202. It should be appreciated that implementations disclosed herein are not limited to on-screen keyboards as physical keyboards may be used, in some implementations, depending on the specific type of device implemented as a user computing platform 104. For example, may BlackBerry® devices include physical keyboards instead of on-screen keyboards.

The dialog entry field subcomponent 114 may be configured to provide a dialog entry field for presentation via user computing platform(s) 104. The dialog entry field may be configured to receive input from an on-screen keyboard, another keyboard, and/or other sources to facilitate editing of user-provided dialog entries. In some implementations, a user may cut and paste information into the dialog entry field. The dialog entry field may be configured to facilitate submission of the user-provided dialog entries. The user-provided dialog entries may include one or more media items. The media items may include one or more of text, digital photos, images, videos, audio files, and/or other media items. In some implementations, the dialog entry field may be configured to receive input by previously copied media items being pasted into the dialog entry field. A non-limiting example of a dialog entry field is illustrated in FIGS. 2A, 2B, 2C, 2D, and 2E by dialog entry field 204.

The dialog window subcomponent 116 may be configured to provide a dialog window for presentation via user computing platform(s) 104. The dialog window may be configured to present previously submitted dialog entries from two or more users. A non-limiting example of a dialog window is illustrated in FIGS. 2A, 2B, 2C, 2D, and 2E by dialog window 206.

The digital media item search component 110 may include one or more of a digital media item search query field subcomponent 118, a digital media item tag field subcomponent 120, a digital media item preview frame subcomponent 122, and/or other subcomponents.

The digital media item search query field subcomponent 118 may be configured to provide a digital media item search query field for presentation via user computing platform(s) 104. The digital media item search query field may be configured to receive input from the on-screen keyboard, another keyboard, and/or other sources. In some implementations, a user may cut and paste information into the digital media item search query field. The digital media item search query field may be configured to facilitate editing of user-provided search queries. The digital media item search query field may be configured to facilitate submission of the user-provided search queries. In some implementations, the user-provided search queries may one or more media items. Examples of such media items may include one or more of text, digital photos, images, videos, audio files, and/or other media items. In some implementations, digital media item search query field may be configured to receive voice inputs of user-provided search queries. The search queries may relate to one or more of people, objects, locations, dates, and/or other queries. A non-limiting example of a digital media item search query field is illustrated in FIGS. 2A, 2B, and 2E by digital media item search query field 208.

The digital media item tag field subcomponent 120 to provide a digital media item tag field for presentation via user computing platform(s) 104. The digital media item tag field may be configured to present digital media item tags. A given digital media item tag may relate to context information associated with individual ones of the digital media items. In some implementations, individual digital media item tags may be associated with specific digital media items based on features disclosed in co-owned and co-pending U.S. patent application Ser. No. 14/792,478 filed Jul. 6, 2015 and entitled "SYSTEMS AND METHODS FOR FACILITATING SEARCHING, LABELING, AND/OR FILTERING OF DIGITAL MEDIA ITEMS," which is incorporated herein by reference. A non-limiting example of a digital media item tag field is illustrated in FIGS. 2A, 2B, 2C, 2D, and 2E by digital media item tag field 210.

The digital media item tags may be presented based on input received by the digital media item search query field. In some implementations, the digital media item tag field may include default tags absent input in the digital media item search query field. Examples of such default tags may include one or more of "recent photos," "favorites," "nearby," and/or other default tags (see, e.g., 210 in FIG. 2A).

The digital media item tag field may be configured to receive user selections of individual digital media item tags. The user may input multiple digital media item tags. In some implementations, the digital media item tag field may be configured to present an option to add a digital media item tag responsive to receipt of a user selection of a given digital media item tag (see, e.g., 210 in FIGS. 2C and 2D).

The digital media item tags presented in the digital media item tag field may be determined based on a prediction of user-provided search queries. For example, an incomplete entry in the digital media item search query field may result in one or more possible digital media item tags based on the prediction. By way of non-limiting illustration, in FIG. 2B, the letters "co" are entered into digital media item search query field 208 and possible corresponding tags "coffee," "Colorado," "computer," and "cooking" are presented in digital media item tag field 210.

The digital media item preview frame subcomponent 122 may be configured to provide a digital media item preview frame for presentation via user computing platform(s) 104. The digital media item preview frame may be configured to present visual previews of digital media items. The digital media items may be one or both of local digital media items or connected digital media items. A non-limiting example of a digital media item preview frame is illustrated in FIGS. 2A, 2B, 2C, 2D, and 2E by digital media item preview frame 212.

The presented digital media items may correspond to digital media item tags presented in the digital media item tag field. In some implementations, the digital media item preview frame may be configured to present recently acquired digital media items absent user selections of individual digital media item tags in the digital media item tag field.

The digital media item preview frame may be configured to receive user selections of individual digital media items to be communicated to one or more other users via the messaging interface. In some implementations, a user selection of a given digital media item presented in the digital media item preview frame may be received responsive to a touch-screen input received at a location corresponding to the given digital media item. A user selection of a given digital media item presented in the digital media item preview frame may result in the given digital media item being copied into memory such that the given digital media item can be pasted into the dialog entry field of the messaging interface. In some implementations, a user selection of a given digital media item presented in the digital media item preview frame may result in the given digital media item being automatically entered into the dialog entry field of the messaging interface. A user selection of a given digital media item presented in the digital media item preview frame may result in the given digital media item being automatically communicated to one or more other users via the messaging interface.

In some implementations, server(s) 102, user computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, user computing platform(s) 104, and/or external resources 124 may be operatively linked via some other communication media.

A given user computing platform 104 may include one or more processors configured to execute machine-readable instructions. The machine-readable instructions may be configured to enable an expert or user associated with the given user computing platform 104 to interface with system 100 and/or external resources 124, and/or provide other functionality attributed herein to user computing platform(s) 104. By way of non-limiting example, the given user computing platform 104 may include one or more of a desktop computer, a laptop computer, a handheld computer, a tablet computing platform, a NetBook, a Smartphone, a gaming console, and/or other computing platforms.

External resources 124 may include sources of information, hosts and/or providers of digital media items outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from user computing platform(s) 104, and/or other information that enables server(s) 102 to function as described herein.

Processor(s) 128 is configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. The processor(s) 128 may be configured to execute machine-readable instruction components and subcomponents 108, 110, 112, 114, 116, 118, 120, 122, and/or other machine-readable instruction components and subcomponents. The processor(s) 128 may be configured to execute machine-readable instruction components and subcomponents 108, 110, 112, 114, 116, 118, 120, 122, and/or other machine-readable instruction components and subcomponents by software; hardware; firmware; some combination of software, hardware, and/or firmware; and/or other mechanisms for configuring processing capabilities on processor(s) 128.

It should be appreciated that although machine-readable instruction components and subcomponents 108, 110, 112, 114, 116, 118, 120, and 122 are illustrated in FIG. 1 as being implemented within a single processing unit, in implementations in which processor(s) 128 includes multiple processing units, one or more of machine-readable instruction components and subcomponents 108, 110, 112, 114, 116, 118, 120, and/or 122 may be implemented remotely from the other components and/or subcomponents. The description of the functionality provided by the different machine-readable instruction components and subcomponents 108, 110, 112, 114, 116, 118, 120, and/or 122 described herein is for illustrative purposes, and is not intended to be limiting, as any of machine-readable instruction components and subcomponents 108, 110, 112, 114, 116, 118, 120, and/or 122 may provide more or less functionality than is described. For example, one or more of machine-readable instruction components and subcomponents 108, 110, 112, 114, 116, 118, 120, and/or 122 may be eliminated, and some or all of its functionality may be provided by other ones of machine-readable instruction components and subcomponents 108, 110, 112, 114, 116, 118, 120, and/or 122. As another example, processor(s) 128 may be configured to execute one or more additional machine-readable instruction components and/or subcomponents that may perform some or all of the functionality attributed below to one of machine-readable instruction components and subcomponents 108, 110, 112, 114, 116, 118, 120, and/or 122.

Figure 3:
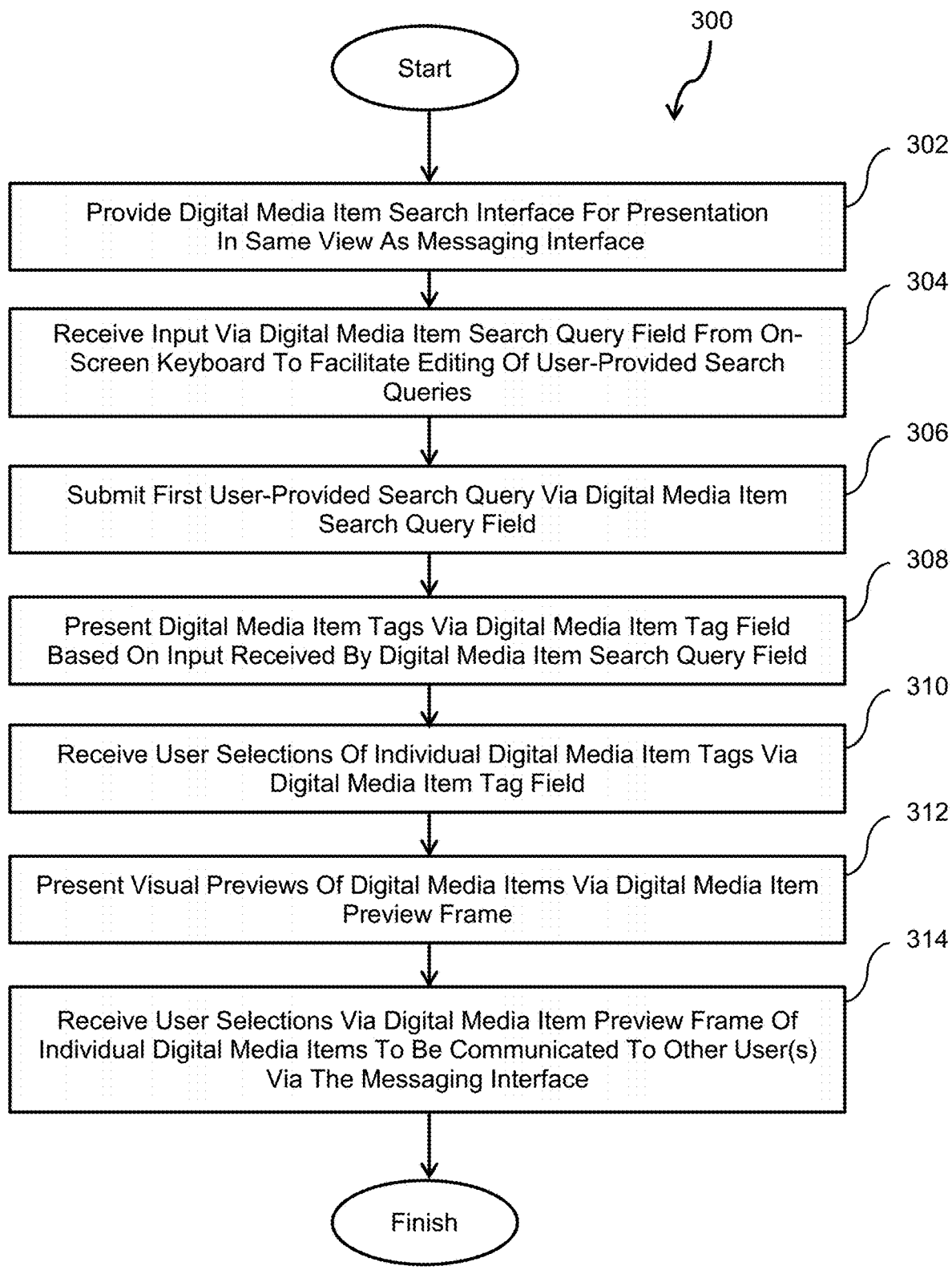
FIG. 3 illustrates a method for facilitating keyboard-based search of local and connected digital media items, in accordance with one or more implementations.

FIG. 3 illustrates a method 300 for facilitating keyboard-based search of local and connected digital media items, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a digital media item search interface may be provided for presentation in the same view as a messaging interface. The digital media item search interface may include a digital media item search query field, a digital media item tag field, and a digital media item preview frame. The messaging interface may include an on-screen keyboard configured to receive user selections of alphanumeric and/or other characters, a dialog entry field configured to receive input from the on-screen keyboard to facilitate editing of user-provided dialog entries and submission of the user-provided dialog entries, and a dialog window configured to present previously submitted dialog entries from two or more users. Operation 302 may be performed by one or more hardware processors configured to execute a machine-readable instruction component that is the same as or similar to messaging interface component 108 and/or digital media item search component 110 (as described in connection with FIG. 1), in accordance with one or more implementations.

At an operation 304, input may be received via the digital media item search query field to facilitate editing of user-provided search queries including a first user-provided search query. Operation 304 may be performed by one or more hardware processors configured to execute a machine-readable instruction component that is the same as or similar to digital media item search query field subcomponent 118 (as described in connection with FIG. 1), in accordance with one or more implementations.

At an operation, 306 the first user-provided search query may be submitted via the digital media item search query field. Operation 306 may be performed by one or more hardware processors configured to execute a machine-readable instruction component that is the same as or similar to digital media item search query field subcomponent 118 (as described in connection with FIG. 1), in accordance with one or more implementations.

At an operation 308, digital media item tags may be presented via the digital media item tag field based on input received by the digital media item search query field. A given digital media item tag may relate to context information associated with individual ones of the digital media items. Operation 308 may be performed by one or more hardware processors configured to execute a machine-readable instruction component that is the same as or similar to digital media item tag field subcomponent 120 (as described in connection with FIG. 1), in accordance with one or more implementations.

At an operation 310, user selections of individual digital media item tags may be received via the digital media item tag field. Operation 310 may be performed by one or more hardware processors configured to execute a machine-readable instruction component that is the same as or similar to digital media item tag field subcomponent 120 (as described in connection with FIG. 1), in accordance with one or more implementations.

At an operation 312, visual previews of digital media items may be presented via the digital media item preview frame. The digital media items may be one or both of local digital media items or connected digital media items. The digital media items may correspond to digital media item tags presented in the digital media item tag field. Operation 312 may be performed by one or more hardware processors configured to execute a machine-readable instruction component that is the same as or similar to digital media item preview frame subcomponent 122 (as described in connection with FIG. 1), in accordance with one or more implementations.

At an operation 314, user selections may be received via the digital media item preview frame of individual digital media items to be communicated to one or more other users via the messaging interface. Operation 314 may be performed by one or more hardware processors configured to execute a machine-readable instruction component that is the same as or similar to digital media item preview frame subcomponent 122 (as described in connection with FIG. 1), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A mobile computing device for facilitating messaging and searching of digital media items via a combined user interface of a mobile application, the mobile computing device comprising:
a display screen; and
one or more processors programmed with computer program instructions that, when executed, cause the mobile computing device to display, on the display screen, the combined user interface of the mobile application, the combined user interface of the mobile application comprising:
a messaging interface portion comprising a dialog entry field that is configured to receive a message to be communicated to another computing device, and
a digital media item search interface portion comprising:
a digital media search query field that is configured to be visible to a user at a same time that the dialog entry field of the messaging interface portion is visible to the user and configured to receive a search query,
a digital media item tag field that is configured to be visible to the user at a same time that the dialog entry field of the messaging interface portion is visible to the user, configured to display one or more digital media item tags based on the search query, and configured to receive a user selection of a digital media item tag of the one or more digital media item tags, and
a digital media item preview frame that is configured to be visible to the user at a same time that the dialog entry field of the messaging interface portion is visible to the user, configured to display a preview of one or more digital media items corresponding to the selected digital media item tag, and configured to receive a user selection of a digital media item of the one or more digital media items to be communicated to the other computing device,
wherein the one or more processors cause the mobile computing device to enter the digital media item into the dialog entry field in response to the user selection of the digital media item, and
wherein the messaging interface portion and digital media item search interface portion of the mobile application are displayed in a non-overlapping manner.

2. The mobile computing device of claim 1, wherein the message to be communicated to the other computing device is at least one of alpha numeric characters, symbols, emojis, ideograms, emoticons, pictographs, or other characters accessible via a keyboard.

3. The mobile computing device of claim 1, wherein the one or more processors cause the mobile computing device to predict the one or more digital media item tags based on a portion of the search query.

4. The mobile computing device of claim 1, wherein the one or more processors cause the mobile computing device to automatically communicate the digital media item to the other computing device in response to the user selection of the digital media item.

5. The mobile computing device of claim 1, wherein the messaging interface portion further comprises:
an on-screen keyboard that is configured to be visible to the user at a same time that the dialog entry field is visible to the user and that facilitates entering of the message into the dialog entry field; and
a dialog window that is configured to be visible to the user at a same time that the dialog entry field is visible to the user and that is configured to display one or more previous entries communicated between the mobile computing device and the other computing device.

6. The mobile computing device of claim 1, wherein the one or more processors are configured to retrieve the one or more digital media items for display from a memory of the mobile computing device or a server, and wherein the one or more digital media items comprise at least one of an image, a video, or an audio.

7. The mobile computing device of claim 1, wherein the digital media item tag field comprises a button to add a new digital media item tag to the digital media item tag field, and wherein the one or more processors cause the mobile computing device to add the new digital media item tag in response to a user selection of the button.

8. The mobile computing device of claim 1, wherein the digital media search query field receives the search query from at least one of a keyboard or a voice input.

9. The mobile computing device of claim 1, further comprising:
a memory that is configured to store the digital media item in response to the user selection of the digital media item.

10. The mobile computing device of claim 1, wherein the digital media item tag field comprises one or more buttons corresponding to the one or more digital media item tags, wherein a portion of the one or more buttons comprises an option to delete the one or more digital media item tags from the digital media item tag field, and wherein the one or more processors cause the mobile computing device to delete the one or more digital media item tags in response to a user selection of the portion of the one or more buttons.

11. A method for facilitating messaging and searching of digital media items via a combined user interface of a mobile application, the method comprising:
displaying, by one or more processors, the combined user interface of the mobile application on a display screen of a mobile computing device, the combined user interface of the mobile application comprising:
a messaging interface portion that comprises a dialog entry field, and
a digital media item search interface portion that comprises a digital media search query field, a digital media item tag field, and a digital media item preview frame, wherein the digital media search query field of the digital media item search interface portion is configured to be visible to a user at a same time that the dialog entry field of the messaging interface portion is visible to the user, wherein the digital media item tag field of the digital media item search interface portion is configured to be visible to the user at a same time that the dialog entry field of the messaging interface portion is visible to the user, and wherein the digital media item preview frame of the digital media item search interface portion is configured to be visible to the user at a same time that the dialog entry field of the messaging interface portion is visible to the user;
receiving, by the one or more processors, at the dialog entry field, a message to be communicated to another computing device;
receiving, by the one or more processors, at the digital media search query field, a search query;
displaying, by the one or more processors, at the digital media item tag field, one or more digital media item tags based on the search query;
receiving, by the one or more processors, at the digital media item tag field, a user selection of a digital media item tag of the one or more digital media item tags;
displaying, by the one or more processors, at the digital media item preview frame, a preview of one or more digital media items corresponding to the selected digital media item tag; and
receiving, by the one or more processors, at the digital media item preview frame, a user selection of a digital media item of the one or more digital media items to be communicated to the other computing device,
wherein the messaging interface portion and digital media item search interface portion of the mobile application are displayed in a non-overlapping manner.

12. The method of claim 11, wherein the message to be communicated to the other computing device is at least one of alpha numeric characters, symbols, emojis, ideograms, emoticons, pictographs, or other characters accessible via a keyboard.

13. The method of claim 11, further comprising:
predicting the one or more digital media item tags based on a portion of the search query.

14. The method of claim 11, further comprising:
automatically entering the digital media item into the dialog entry field and automatically communicating the digital media item to the other computing device in response to the user selection of the digital media item.

15. The method of claim 11, wherein the messaging interface portion further comprises an on-screen keyboard and a dialog window, wherein the on-screen keyboard is configured to be visible to the user at a same time that the dialog entry field is visible to the user, and wherein the dialog window is configured to be visible to the user at a same time that the dialog entry field is visible to the user, the method further comprising:
entering, via the on-screen keyboard, the message into the dialog entry field; and
displaying, at the dialog window, one or more previous entries communicated between the mobile computing device and the other computing device.

16. The method of claim 11, further comprising:
retrieving the one or more digital media items for display from a memory of the mobile computing device or a server,
wherein the one or more digital media items comprise at least one of an image, a video, or an audio.

17. The method of claim 11, wherein the digital media item tag field comprises a button to add a new digital media item tag to the digital media item tag field, the method further comprising:
adding the new digital media item tag in response to a user selection of the button.

18. The method of claim 11, further comprising:
receiving, at the digital media search query field, the search query from at least one of a keyboard or a voice input; and
storing, at a memory of the mobile computing device, the digital media item in response to the user selection of the digital media item.

19. A mobile computing device for facilitating messaging and searching of digital media items via a combined user interface of a mobile application, the mobile computing device comprising:
a display screen; and
one or more processors programmed with computer program instructions that, when executed, cause the mobile computing device to display, on the display screen, the combined user interface of the mobile application, the combined user interface of the mobile application comprising:
a messaging interface portion comprising a dialog entry field that is configured to receive a message to be communicated to another computing device; and
a digital media item search interface portion comprising:
a digital media search query field that is configured to be visible to a user at a same time that the dialog entry field of the messaging interface portion is visible to the user and configured to receive a search query;
a digital media item tag field that is configured to be visible to the user at a same time that the dialog entry field of the messaging interface portion is visible to the user, configured to display one or more digital media item tags based on the search query, and configured to receive a user selection of a digital media item tag of the one or more digital media item tags; and
a digital media item preview frame that is configured to be visible to the user at a same time that the dialog entry field of the messaging interface portion is visible to the user, configured to display a preview of one or more digital media items corresponding to the selected digital media item tag, and configured to receive a user selection of a digital media item of the one or more digital media items to be communicated to the other computing device,
wherein the messaging interface portion and digital media item search interface portion of the mobile application are displayed in a non-overlapping manner.

20. The method of claim 11, wherein the digital media item tag field comprises one or more buttons corresponding to the one or more digital media item tags, and wherein a portion of the one or more buttons comprises an option to delete the one or more digital media item tags from the digital media item tag field, the method further comprising:
deleting the one or more digital media item tags in response to a user selection of the portion of the one or more buttons.

\* \* \* \* \*